United States Patent
Croak et al.

(10) Patent No.: US 7,965,700 B1
(45) Date of Patent: Jun. 21, 2011

(54) METHOD AND APPARATUS FOR ENABLING SERVICE INDICATORS IN A CALL CONTROL ELEMENT

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 962 days.

(21) Appl. No.: 11/017,986

(22) Filed: Dec. 21, 2004

(51) Int. Cl.
*H04L 12/66* (2006.01)
(52) U.S. Cl. .............. 370/352; 379/201.01; 379/207.02; 379/220.01; 379/221.09
(58) Field of Classification Search .................. 370/260, 370/261, 352–356, 400, 401, 396.61–396.65, 370/395.43, 466, 467; 379/900, 220.01, 379/201.01, 207.02, 221.09, 88.17; 709/238–242
See application file for complete search history.

(56) References Cited

U.S. PATENT DOCUMENTS

| | | | |
|---|---|---|---|
| 2004/0068533 A1* | 4/2004 | Tenhunen et al. | 709/200 |
| 2004/0190689 A1* | 9/2004 | Benitez Pelaez et al. | 379/88.13 |
| 2005/0078812 A1* | 4/2005 | Batni et al. | 379/207.16 |

* cited by examiner

*Primary Examiner* — Ahmad F Matar
*Assistant Examiner* — Antim Shah

(57) ABSTRACT

The present invention enables the CCE to store intelligence about the services the subscribers use as companion data to the IP route to reach the desired user. The present invention introduces a service indicator to allow the CCE to distinguish whether a call requires advanced application processing. If no advanced application processing is needed, the CCE uses its companion data of IP route to setup a call without communicating with an application server. This would enable the CCE to direct calls to advance application servers only when subscribers required advanced application processing, thereby reducing the overall processing time required to setup a call to avoid the problem of signaling timers expiring unnecessarily.

15 Claims, 4 Drawing Sheets

METHOD AND APPARATUS FOR ENABLING SERVICE INDICATORS IN A CALL CONTROL ELEMENT

The present invention relates generally to communication networks and, more particularly, to a method and apparatus for enabling service indicators in Call Control Element in packet-switched networks, e.g., Voice over Internet Protocol (VoIP) networks.

BACKGROUND OF THE INVENTION

Network providers strive to provide highly reliable networks. Signaling messages that flow between network elements must be perfectly timed in order to align with timers active within these elements. The more signaling messages that have to traverse network element boundaries, the more likely timer errors, such as timer expirations, will occur and cause call setup failures. Some implementations require a Call Control Element (CCE) to communicate with an Application Server (AS) whenever an inbound call is directed to a subscriber. Broadly defined, the CCE is the network element that performs call control functions to setup a call, and the AS is a network element that comprises the data as well as applications that the CCE needs in order to setup a call. The Application Server checks to see if the call legs require any special processing as a function of what services the receiver or originator may be subscribed to. Since this interaction between the CCE and AS must occur for every inbound call, timing delays and other signaling complexities can easily happen to cause signaling related timers to expire and cause call setup failures.

Therefore, a need exists for a method and apparatus for enabling service indicators in Call Control Element in packet-switched networks, e.g., Voice over Internet Protocol (VoIP) networks.

SUMMARY OF THE INVENTION

In one embodiment, the present invention enables the CCE to store intelligence about the services the subscribers use as companion data to the IP route to reach the desired user. The present invention introduces a service indicator to allow the CCE to distinguish a call requires advanced application processing. If no advanced application processing is needed, the CCE uses its companion data of IP route to setup a call without communicating with the AS. This would enable the CCE to direct calls to advance application servers only when subscribers required advanced application processing, thereby reducing the overall processing time required to setup a call to avoid the problem of signaling timers expiring unnecessarily.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
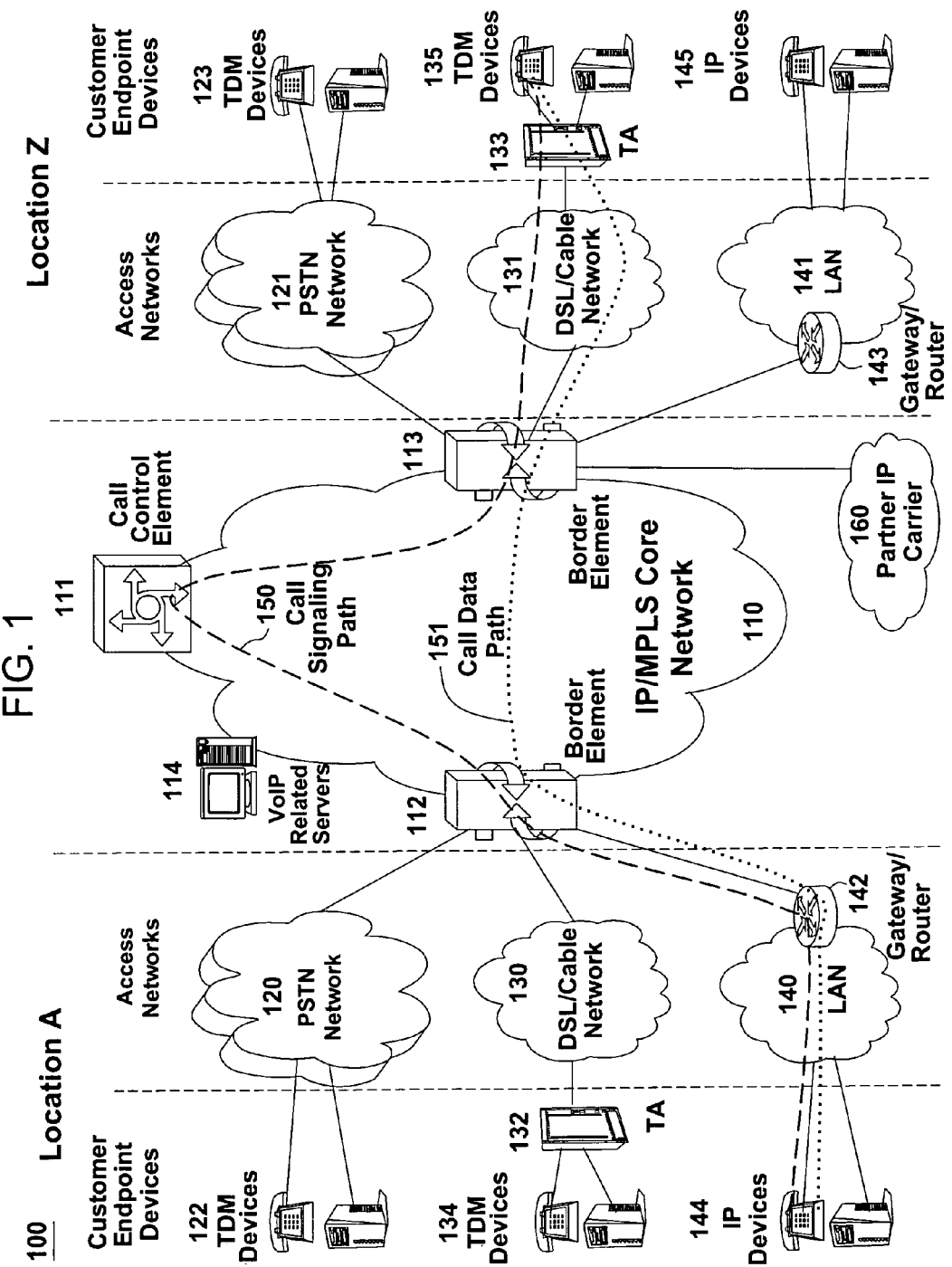
FIG. 1 illustrates an exemplary Voice over Internet Protocol (VoIP) network related to the present invention.

To better understand the present invention, FIG. 1 illustrates an example network, e.g., a packet-switched network such as a VoIP network related to the present invention. The VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. An IP network is broadly defined as a network that uses Internet Protocol to exchange data packets.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Network providers strive to provide highly reliable networks. Signaling messages that flow between network elements must be perfectly timed in order to align with timers active within these elements. The more signaling messages that have to traverse network element boundaries, the more likely timer errors, such as timer expirations, will occur and cause call setup failures. Some implementations require a Call Control Element (CCE) to communicate with an Application Server (AS) whenever an inbound call is directed to a subscriber. Broadly defined, the CCE is the network element that performs call control functions to setup a call, and the AS is a network element that comprises the data as well as applications that the CCE needs in order to setup a call. The Application Server checks to see if the call legs require any special processing as a function of what services the receiver or originator may be subscribed to. Since this interaction between the CCE and AS must occur for every inbound call, timing delays and other signaling complexities can easily happen to cause signaling related timers to expire and cause call setup failures.

To address this criticality, the present invention enables the CCE to store intelligence about the services the subscribers use as companion data to the IP route to reach the desired user. The present invention introduces a service indicator to allow the CCE to distinguish a call requires advanced application processing. If no advanced application processing is needed, the CCE uses its companion data of IP route to setup a call without communicating with the AS. This would enable the CCE to direct calls to advance application servers only when subscribers required advanced application processing to reduce the overall processing time required to setup a call to avoid the problem of signaling timers expiring unnecessarily.

Figure 2:
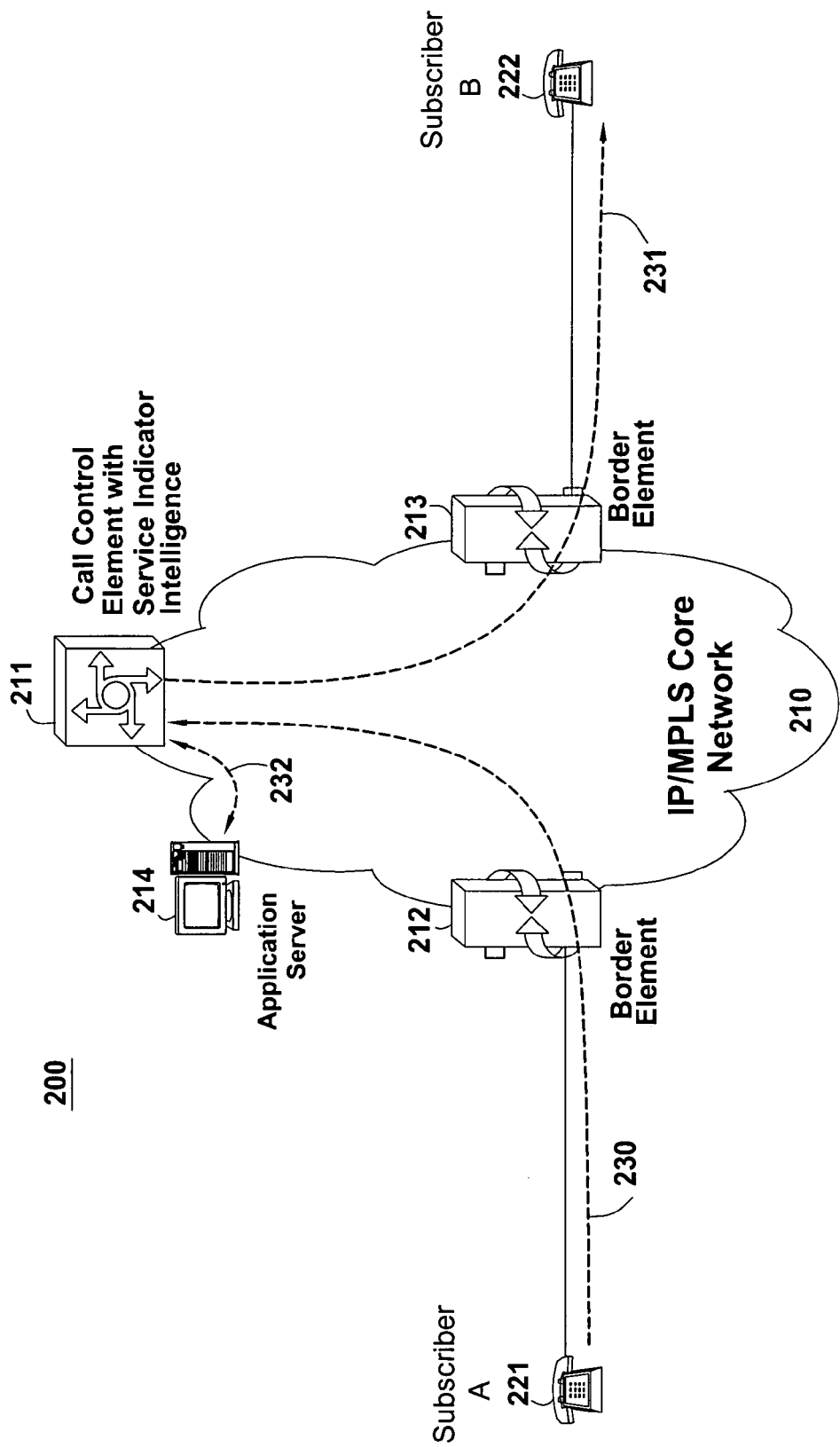
FIG. 2 illustrates an example of enabling service indicators in Call Control Element in a VoIP network of the present invention.

FIG. 2 illustrates an example of enabling service indicators in Call Control Element in a VoIP network. Subscriber A, 221, makes a call to subscriber B, 222. CCE 211 receives a call setup message originated by subscriber A, flow 230. CCE 211 stores the data related to the services subscribed by all subscribers in the network and classifies if a subscriber requires advanced application processing by the Application Server (AS). CCE 211 queries its stored data regarding services subscribed by subscriber A and B to determine if Application Server (AS) 214 needs to be accessed to retrieve necessary service logic and data.

If the call requires access to AS 214, CCE 211 will communicate with AS 214, flow 232, to retrieve the necessary application service logic and data to process the call. After retrieving the needed application and data, CCE 211 will continue the call setup message 231 toward subscriber B. If the call requires no access to AS 214, CCE 211 will query its own companion data of subscribers' endpoint IP addresses and then continue the call setup message 231 toward subscriber B.

Figure 3:
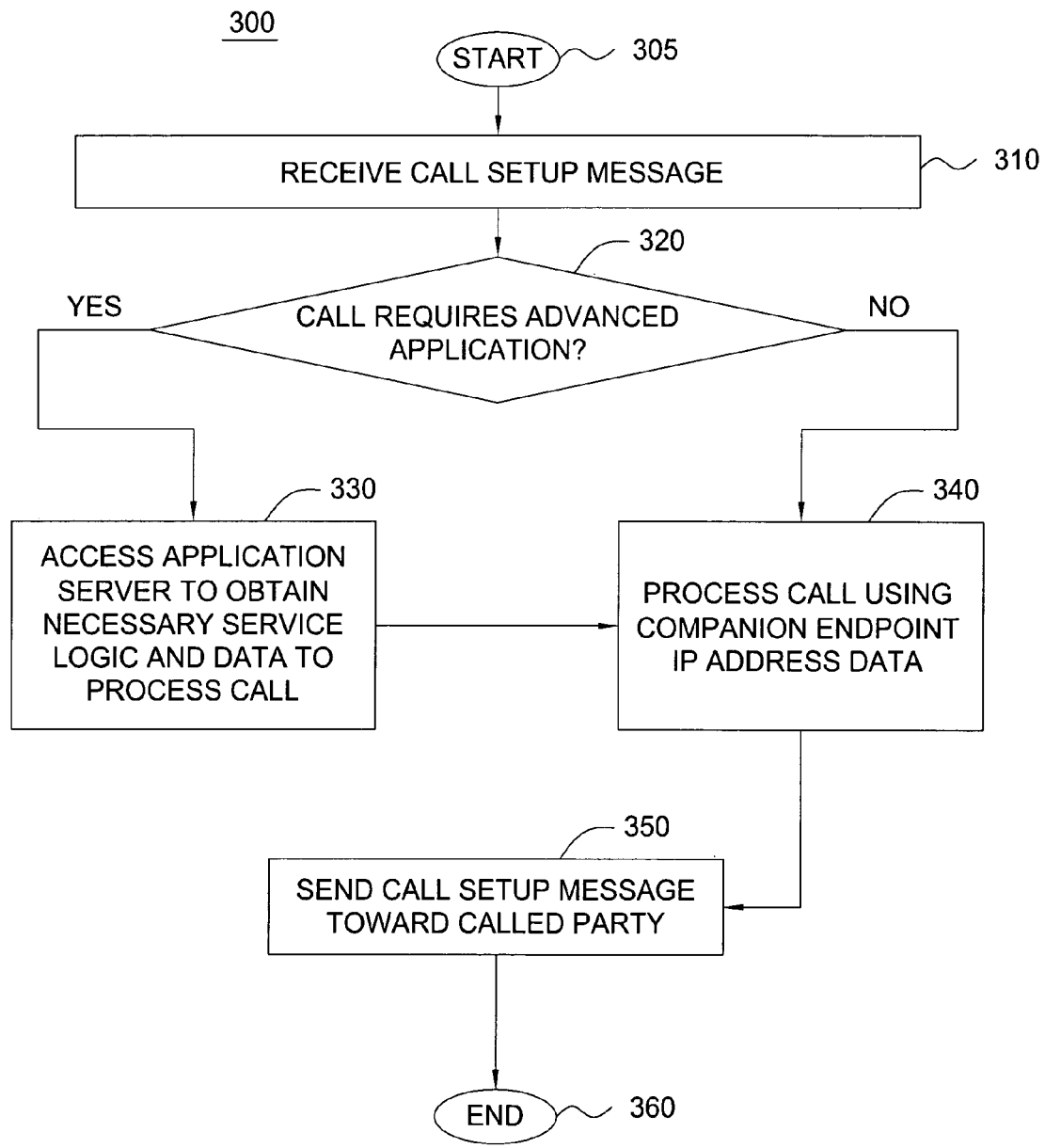
FIG. 3 illustrates a flowchart of a method for enabling service indicators in Call Control Element in a VoIP network of the present invention.

FIG. 3 illustrates a flowchart of a method for enabling service indicators in Call Control Element in a VoIP network. Method 300 starts in step 305 and proceeds to step 310.

In step 310, the method receives a call setup message with the calling and the called party information. In step 320, the method, using its stored the service indicator regarding services subscribed by the calling and the called party, determines if the AS needs to be involved in the call processing. If the AS does not need to be involved, the method proceeds to step 340; otherwise, the method proceeds to step 330. In step 330, the method communicates with the AS to retrieve the necessary service application and data to process the call. In step 340, the method uses its own companion data on endpoint IP addresses of the calling and the called party to process the call. In step 350, the method sends the processed call setup message toward subscriber B to complete the call setup procedures. The method ends in step 360.

Figure 4:
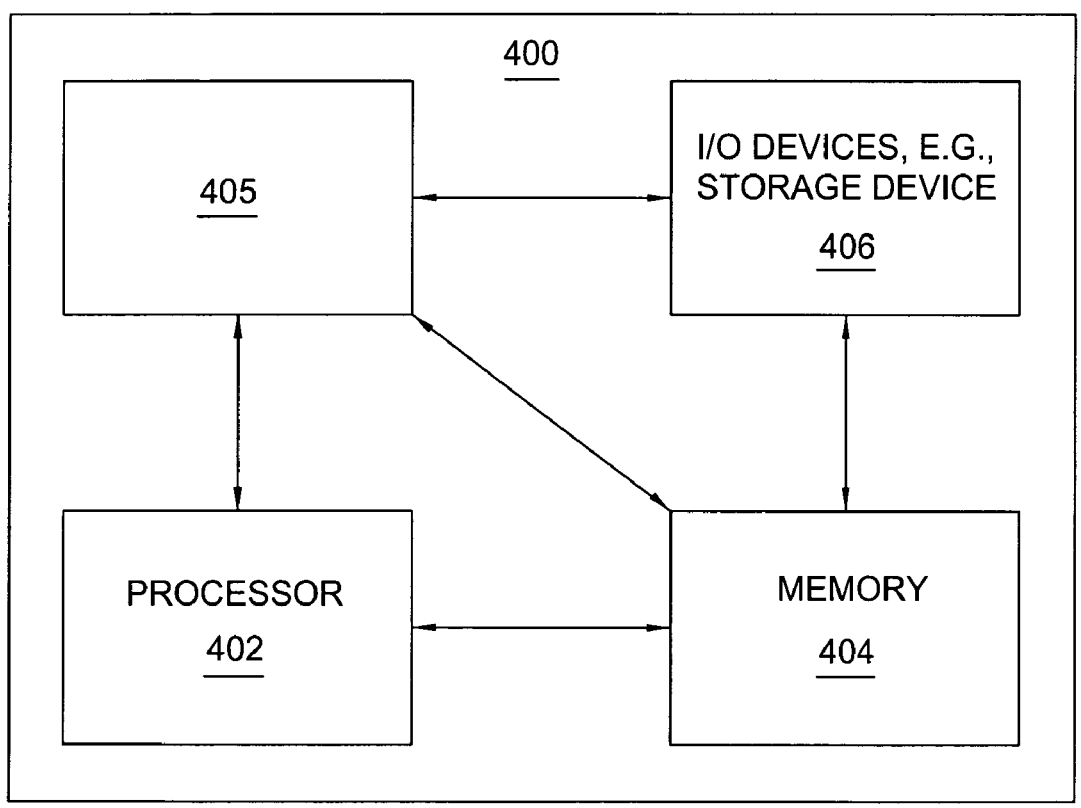
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a service indicator in CCE module 405, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present service indicator in CCE module or process 405 can be loaded into memory 404 and executed by processor 402 to implement the functions as discussed above. As such, the present service indicator in CCE process 405 (including associated data structures) of the present invention can be stored on a computer readable medium or carrier, e.g., RAM memory; magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing a call in a communication network, comprising:
   receiving a call setup message at a call control element from a calling party to a called party, wherein the call control element is deployed in the communication network, wherein the communication network is an internet protocol network; and
   processing by the call control element the call setup message in accordance with a service indicator stored at the call control element, wherein the service indicator indicates if processing of the call setup message requires access to an application server to retrieve application service logic and data, wherein the processing comprises continuing the call setup message towards the called party using stored data of a plurality of endpoint internet protocol addresses, if the service indicator indicates the call setup message does not require an invocation of the application server, wherein the call control element is external to the application server.

2. The method of claim 1, wherein the communication network is a voice over internet protocol network.

3. The method of claim 1, wherein the calling party is a subscriber of the communication network.

4. The method of claim 1, wherein the service indicator is based on a service subscribed by the calling party.

5. The method of claim 1, wherein the processing comprises:
   accessing the application server to retrieve the application service logic and data if the service indicator indicates the call setup message requires the invocation of the application server; and
   continuing the call setup message towards the called party using the stored data of the plurality of endpoint internet protocol addresses.

6. A computer-readable medium having stored thereon a plurality of instructions, the plurality of instructions including instructions which, when executed by a processor, cause the processor to perform a method for processing a call in a communication network, comprising:
   receiving a call setup message at a call control element from a calling party to a called party, wherein the call control element is deployed in the communication network, wherein the communication network is an internet protocol network; and
   processing by the call control element the call setup message in accordance with a service indicator stored at the call control element, wherein the service indicator indicates if processing of the call setup message requires access to an application server to retrieve application service logic and data, wherein the processing comprises continuing the call setup message towards the called party using stored data of a plurality of endpoint Internet protocol addresses, if the service indicator indicates the call setup message does not require an invocation of the application server, wherein the call control element is external to the application server.

7. The computer-readable medium of claim 6, wherein the communication network is a voice over internet protocol network.

8. The computer-readable medium of claim 6, wherein the calling party is a subscriber of the communication network.

9. The computer-readable medium of claim 6, wherein the service indicator is based on a service subscribed by the calling party.

10. The computer-readable medium of claim 6, wherein the processing comprises:
    accessing the application server to retrieve the application service logic and data if the service indicator indicates the call setup message requires the invocation of the application server; and
    continuing the call setup message towards the called party using the stored data of the plurality of endpoint internet protocol addresses.

11. An apparatus for processing a call in a communication network, comprising:
    a call control element deployed in the communication network for receiving a call setup message from a calling party to a called party, and for processing the call setup message in accordance with a service indicator stored at the call control element, wherein the communication network is an internet protocol network, wherein the service indicator indicates if processing of the call setup message requires access to an application server to retrieve application service logic and data, wherein the processing comprises continuing the call setup message towards the called party using stored data of a plurality of endpoint internet protocol addresses, if the service indicator indicates the call setup message does not require an invocation of the application server, wherein the call control element is external to the application server.

12. The apparatus of claim 11, wherein the communication network is a voice over internet protocol network.

13. The apparatus of claim 11, wherein the calling party is a subscriber of the communication network.

14. The apparatus of claim 11, wherein the service indicator is based on a service subscribed by the calling party.

15. The apparatus of claim 11, wherein the processing comprises:
    accessing the application server to retrieve the application service logic and data if the service indicator indicates the call setup message requires the invocation of the application server; and
    continuing the call setup message towards the called party using the stored data of the plurality of endpoint Internet protocol addresses.

* * * * *